(12) United States Patent
Williams et al.

(10) Patent No.: US 7,272,893 B2
(45) Date of Patent: Sep. 25, 2007

(54) ROLLING ELECTRONIC LENGTH MEASURING DEVICE

(75) Inventors: Michael Williams, Mooresville, NC (US); Jeffrey L. Spanski, Weddington, NC (US); Derek J. Nash, Huntersville, NC (US); John C. Smith, Denver, NC (US); Daily Gist, Huntersville, NC (US)

(73) Assignee: Irwin Industrial Tool Company, Freeport, IL (US)

( * ) Notice: Subject to any disclaimer, the term of this patent is extended or adjusted under 35 U.S.C. 154(b) by 0 days.

(21) Appl. No.: 11/699,651

(22) Filed: Jan. 30, 2007

(65) Prior Publication Data

US 2007/0124952 A1    Jun. 7, 2007

Related U.S. Application Data

(63) Continuation of application No. 11/372,574, filed on Mar. 10, 2006, now Pat. No. 7,178,259, which is a continuation of application No. 10/894,277, filed on Jul. 19, 2004, now Pat. No. 7,036,241.

(51) Int. Cl.
*G01B 3/12*   (2006.01)

(52) U.S. Cl. .......................................... 33/773; 33/772

(58) Field of Classification Search .................. 33/773, 33/772
See application file for complete search history.

(56) References Cited

U.S. PATENT DOCUMENTS 4,181,959 A * 1/1980 Tateishi ....................... 702/164
4,181,960 A * 1/1980 Tateishi et al. ............. 702/164
4,185,390 A * 1/1980 Tateishi ....................... 33/762
4,195,348 A * 3/1980 Kakutani ..................... 702/164
4,316,081 A * 2/1982 Washizuka et al. ........... 377/18

(Continued)

OTHER PUBLICATIONS

Internet web page print out of internet access: http://www.professionalequipment.com/xq/ASP/Product__ ID.1854/id.15/Subid.125/qx/defaul. . . Dated May 28, 2004 (2 pages) Pertaining to the "Leica Disto Plus Laser Distance Measurer".

(Continued)

*Primary Examiner*—Christopher W Fulton
(74) *Attorney, Agent, or Firm*—Marshall, Gerstein & Borun LLP

(57) ABSTRACT

An electronic measuring device is disclosed which includes a pair of wheels connected to an axle that passes through a drive gear. The drive gear is enmeshed to a second gear which, in turn, is coaxially connected to an encoder disk. The encoder disk has spaced-apart fins around its outer periphery. As the wheels turn and the encoder disk rotates, the fins and openings between the fins pass between an emitter and a receiver. The emitter and receiver are linked to a controller which calculates the distance traversed by the wheels based upon the number of fins that pass between the emitter and receiver, or with an active counting system (ACS). The controller also includes functions to establish start and stop points for a measurement and an easy means for dividing a measured distance into equal parts or segments and a means for marking the boundary points that define the segments when the measuring device is rolled back across the measured distance. The device can be used on both planar and non-planar surfaces.

19 Claims, 8 Drawing Sheets

U.S. PATENT DOCUMENTS

| | | | | |
|---|---|---|---|---|
| 4,551,847 | A | * | 11/1985 | Caldwell .................... 377/24 |
| 4,700,484 | A | * | 10/1987 | Frank et al. .................. 33/773 |
| 4,747,215 | A | * | 5/1988 | Waikas ....................... 33/763 |
| 4,890,392 | A | * | 1/1990 | Komura et al. ............... 33/762 |
| 4,896,280 | A | * | 1/1990 | Phillips ..................... 702/164 |
| 5,027,526 | A | * | 7/1991 | Crane ......................... 33/763 |
| 5,060,394 | A | * | 10/1991 | Lincoln et al. ............... 33/763 |
| 5,107,598 | A | * | 4/1992 | Woznow et al. .............. 33/521 |
| 5,142,793 | A | | 9/1992 | Crane |
| 5,426,863 | A | | 6/1995 | Biggel |
| 5,433,014 | A | | 7/1995 | Falk et al. |
| 5,577,330 | A | | 11/1996 | Cheng |
| 5,749,522 | A | | 5/1998 | Smrt |
| 5,894,678 | A | | 4/1999 | Masreliez et al. |
| 6,658,755 | B2 | | 12/2003 | Arlinsky |
| 7,036,241 | B2 | * | 5/2006 | Williams et al. ............... 33/773 |
| 7,178,259 | B2 | * | 2/2007 | Williams et al. ............... 33/773 |
| 2003/0037448 | A1 | | 2/2003 | Saksa |
| 2003/0218469 | A1 | | 11/2003 | Brazell et al. |
| 2004/0040170 | A1 | | 3/2004 | Sanoner |

OTHER PUBLICATIONS

Internet web page print out of internet address: http://www.amazon.com/exec/obidos/tg/detail/-/B000037X0V/ref=ase_dealtime-dah/104 . . . Dated May 28, 2007 (2 pages) Pertaining to the "Stanley 77-008 Intell Tape Digital Tape Rule" device.

Internet web page print out of internet address: http://store.yahoo.com/tylertool/zirrep25tapm.html Dated May 28, 2004 (1 page) Pertaining to the "Zircon Repeater 25' Tape Measure" device.

Internet web page print out of internet address: http://store.yahoo.com/able-america/calin33lasdi.html Dated May 28, 2004 (2 pages) Pertaining to the "Calculated Industries Calculator 3336 Laser Dimension" device.

Internet web page print out of internet address: http://www.professionalequipment.com/xq/ASP/ProductID.1384/id.15/subid.126/qx/defaul . . . Dated May 28, 2004 (2 pages) Pertaining to the DigiTape Digital Measuring Tape 16 ft. device.

* cited by examiner

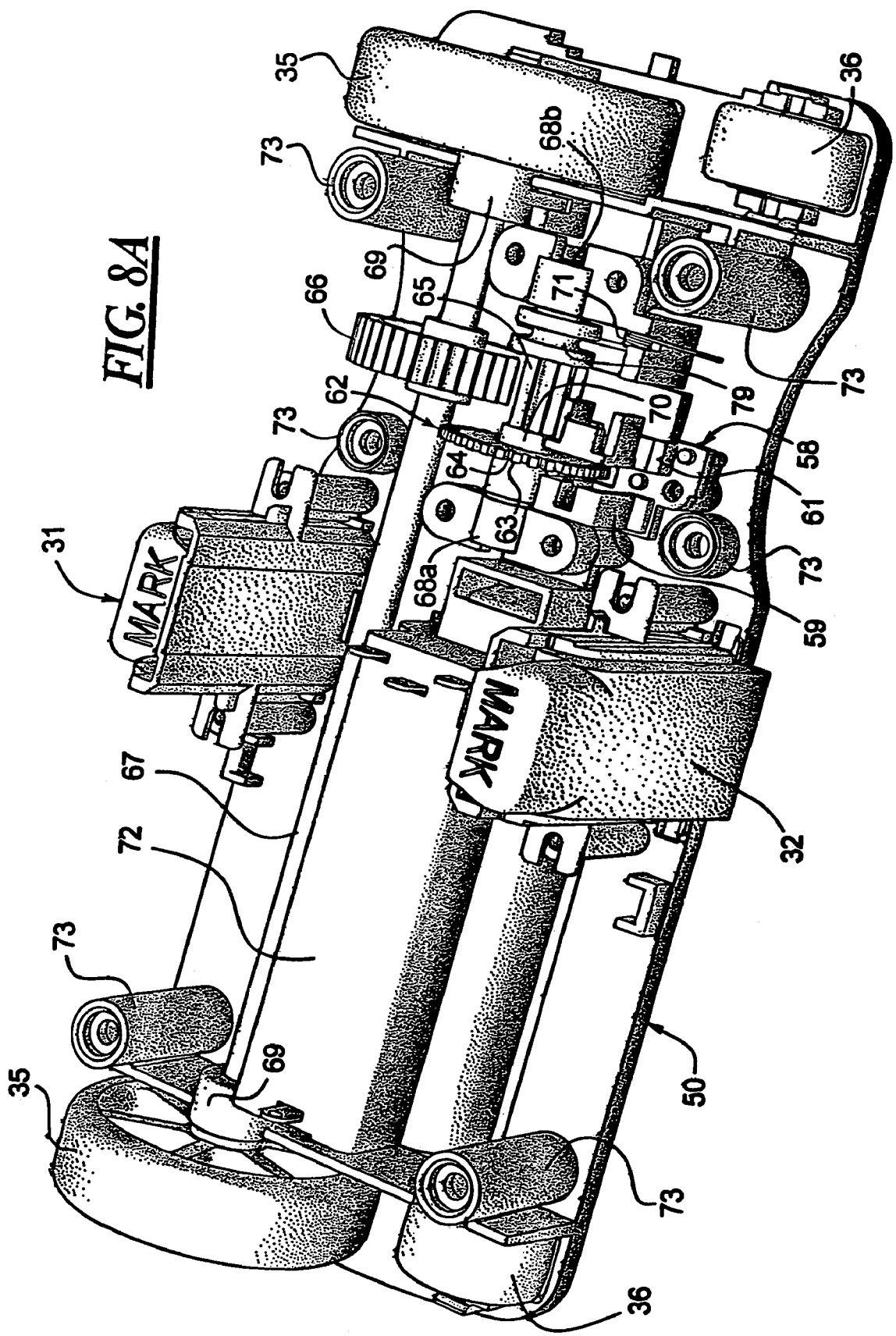

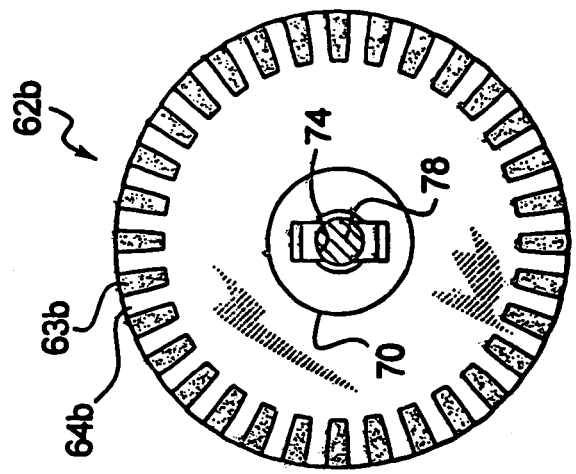
*FIG. 8E*
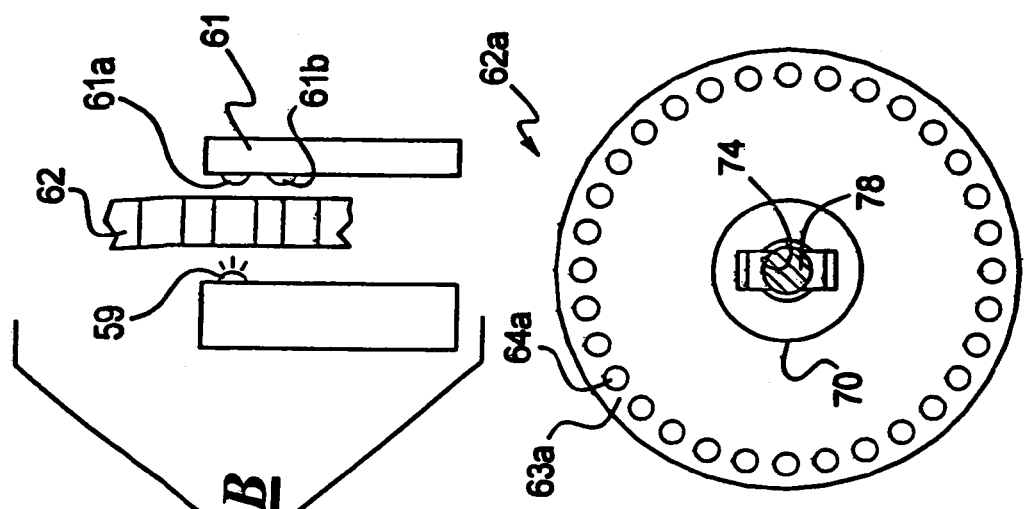
*FIG. 8B*
*FIG. 8D*
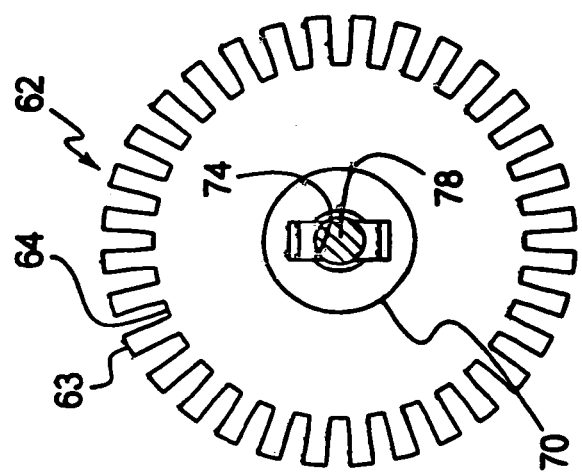
*FIG. 8C*

ROLLING ELECTRONIC LENGTH MEASURING DEVICE

RELATED APPLICATIONS

This patent application is a continuation of U.S. patent application Ser. No. 11/372,574, filed Mar. 10, 2006 now U.S. Pat. No. 7,178,259, which is a continuation of U.S. patent application Ser. No. 10/894,277, filed Jul. 19, 2004 now U.S. Pat. No. 7,036,241. Both U.S. patent application Ser. Nos. 10/894,277 and 11/372,574 are hereby incorporated by reference.

TECHNICAL FIELD

This disclosure relates generally to measuring devices, such as measuring tapes. However, the disclosed device is an electronic measuring device that rolls along the surface to be measured. Accordingly, the device is suitable for non-planar surfaces including curved surfaces. The disclosed device provides an alternative to metallic coiled tape measuring devices, cloth or plastic measuring tapes and sonic or laser measuring devices.

BACKGROUND OF THE RELATED ART

One problem associated with conventional measuring devices such as tape measures, rulers, yard sticks or even sonic or laser type electronic devices is that certain measurements are difficult to obtain. Specifically, accurately measuring the length of a curved or non-planar surface with a metal tape measure is difficult. Further, cloth or fabric tape measures similar to the ones used by tailors are not convenient in certain environments, such as construction sites because they are not easily retracted to a coiled position like the common metal tape measures. Electronic devices relying upon sonic or laser technology to measure distances are only suitable for straight measurements or line-of-site measurements.

Another problem associated with currently available length or distance measuring devices is that the manipulation of the obtained measurement must be performed by the user with or without the use of a separate calculator. For example, if a measured distance needs to be divided into a number of equal segments, the user of a conventional tape measure must first make the measurement, record the length, perform the required division and then, using the tape measure, mark off the desired segments. This process is cumbersome and tedious and often results in errors. Errors in such measurements the fields in carpentry or home remodeling can be costly or damaging particularly if one or more holes are drilled in a wall or surface at one or more incorrect locations.

While traditional tape measures with a coiled measuring tape have been combined with calculators, these devices have not been commercially successful because they fail to address the problem of measuring the distance of a non-planar or irregular surface such as a curved wall. Further, the known combination calculator/tape measure devices merely combine a calculator with a tape measure and do not provide the user with any convenient means for dividing a measured distance into equal lengths or segments and accurately marking those segments.

Accordingly, there is a need for an improved measuring device that can accurately measure the length of a surface that is non-planar and that further can easily and conveniently divide the measured length into one or more equal segments and provide the user with a quick and easy system to mark off the equal segments.

SUMMARY OF THE DISCLOSURE

An improved electronic measuring device is disclosed which can measure the length or distance along almost any surface, including both planar and non-planar surfaces. In an embodiment, one disclosed device comprises at least one wheel for engaging or rolling along the surface to be measured. The wheel is mounted on an axle. The axle is coupled, either directly or indirectly, to an encoder disk so that rotation of the wheel results in rotation of the encoder disk.

In one embodiment, the encoder disk comprises a plurality of circumferentially spaced-apart opaque sections disposed between translucent sections. The opaque and translucent sections (or the outer periphery of the encoder disk) pass between an emitter and at least one receiver as the encoder disk and wheel rotate. The emitter and receiver(s) are linked to a controller. The controller computes the length or distance traveled by the wheel based upon the number of opaque sections (or translucent sections) that pass between the emitter and receiver during rotation of the wheel.

The encoder disk may be provided in a variety of forms. For example, the opaque sections may be fins and the translucent sections may be gaps or openings between the fins. The encoder disk may be optically clear with spaced apart-opaque markings along its outer periphery that serve as light-blocking sections with gaps or spaces of clear material disposed between the opaque markings. As another example, the encoder disk may be made from an opaque material with though-holes disposed about its outer periphery that allow light to pass through to the receiver(s) and the opaque material between the through-holes serves the purposed of blocking light like the opaque sections or fins discussed above.

In a refinement, the axle passes through and is connected to a first gear. The first gear is enmeshed with a second gear. The second gear is coaxially connected to the encoder disk. In this embodiment, rotation of the wheel causes rotation of the axle thereby imparting rotation to the first gear, second gear and encoder disk.

Alternatively, the axle may be directly coupled to the encoder disk without a gear train coupling the axle to the encoder disk. If a gear train is utilized, to prevent backlash when the directional movement of the device is quickly reversed, the axle or shaft supporting the second gear and encoder disk may be loosely supported in a bearing and biased towards the first gear using a spring.

In a refinement, the at least one wheel comprises two wheels coaxially connected together by the axle with the first gear disposed between the two wheels and mounted on the axle. By using two wheels, it is easier for the user to roll the measuring device along a straight line.

In another refinement, the device comprises a display, such as a liquid crystal display (LCD) or other type of display linked to the controller for displaying the distance traveled by the measuring wheel as computed by the controller.

In another refinement, the device further comprises a lower base structure connected to an upper housing. The base has openings for the one or more wheels that roll along the surface to be measured. The base is also connected to at least one bearing for rotatably supporting the axle and at least one bearing for rotatably supporting the second gear and encoder disk. Of course, the bearings may also be connected to the upper housing. Also, the bearings may be molded as an integral part of either the upper housing or base.

In another refinement, the emitter and receiver are both mounted to a first printed circuit board (PCB). The first PCB is linked to a second PCB that is connected to and supports the controller and LCD.

Further, the second PCB may be linked to a plurality of control buttons. Each control button extending upward through openings disposed in the upper housing is linked to the controller to activate a program function of the controller.

In another refinement, at least one of the control buttons is used to activate a computation by the controller to account for the width of the housing or the width of the measuring device.

In another refinement, at least one of the buttons is used to activate a computation by the controller to divide the length previously measured into a plurality of equal segments. The segments may be defined by a "point" between adjacent segments. In such a refinement, as the device is rolled back across the previously measured distanced, the controller provides an indication when the device is approaching and traversing a "point."

In another refinement, the segments are numbered and the number of the segment being traversed is indicated on the display as the device is moved back across the previously measured length. Further, in such a refinement, the display indicates when the device is approaching the next segment so as to provide an early warning to the user as to how close the device is to the next segment so that the user can be ready to place a mark or other indicia on the surface at the designated "point."

Further, the housing of the device may comprise two opposite side walls that are generally parallel to the axle that supports the one or more wheels. In an embodiment, each side wall is slidably connected to an end stop. Each end stop structure comprises a lower distal end having a tapered point. Each end stop is movable between one or more lower positions where the tapered point can make an indentation or a marking on the surface being measured and an upper position where the tapered points are disposed above the surface being measured and therefore out of the way. It may also be preferable for the end stops to have a range of motion that extends below the surface being measures (or below the wheel or wheels that roll along the surface being measured) so that the end stop can be used to start a measurement at an end of a board or other structure.

Preferably, the end stops are biased into the upper position and are pressed downward by overcoming the bias to press the tapered point against the surface being measured to mark one of the calculated "points" as discussed above or beginning and an ending points of a measurement.

Also, each tapered point is preferably in vertical alignment with the outer surface of its respective side wall of the housing so that the tapered points can be accurately used to define the width of the housing which, in turn, can be easily accommodated for by the controller when making a measurement. Further, in a preferred embodiment, when an end stop is extended downward beyond the surface being measured (i.e. past the wheels), the inside surface of the end stop is in vertical alignment with the outer surface of its respective side wall of the housing so the inside surface of the end stop can be used as an accurate start or stop point of a measurement.

For example, the user can press a control button to indicate to the controller which side wall of the housing is serving as a starting point for the measurement. After the device has been rolled across the surface to be measured, the user then may press a button to indicate to the controller which side of the device serves as the end point for the measurement. If different side walls or sides of the device serve as the starting or end points, the controller can easily accommodate for the "width" of the upper housing of the device by adding the width of the housing to the computed length thereby providing for an accurate measurement.

Of course, there will be times when the width of the housing needs to be subtracted from the computed length or not taken into consideration at all.

In another refinement, the device includes a pair of guide rollers for stabilizing the device thereby providing a pair of measuring wheels and a pair of guide rollers.

In another refinement, the opaque and translucent sections of the encoder disk each have a uniform width and the receiver is a dual receiver that comprises two spaced-apart receiving elements. The receiving elements are spaced-apart by a distance less than the uniform width of the translucent and/or opaque sections which thereby enables the controller to determine the direction of travel of the encoder disk and therefore the direction of travel of the measuring device. Preferably, the emitter is a light emitting diode (LED).

An improved method for measuring a length or a distance along a work surface that may be planar or non-planar is also disclosed. The method comprises rolling a wheel of a measuring device as described above along the length or distance to be measured, computing the length or distance traveled by the wheel by counting the number of opaque or translucent sections that pass between the emitter and the receiver as the wheel is rolled along the length or distance and determining a direction of travel of the encoder disk and therefore the wheel by the order in which the receiving elements are shielded from light emitted by the emitter by the passing opaque sections of the rotating encoder disk.

In a refinement, the method may also accommodate for the width of the measuring device and the method may also include the option of dividing the measured length into equal segments and enabling the user to retrace the length and easily mark off the equal segments at predetermined "points."

Other features and advantages of the disclosed is devices and methods will be apparent to those of ordinary skill in the art in view of the detailed description provided below which is made with reference to the attached drawings provided in illustration of one preferred embodiment.

BRIEF DESCRIPTION OF THE DRAWINGS

FIG. 6 is a perspective view of the controller, control panel or control button panel and a PCB of a disclosed measuring device;

FIG. 7 is a perspective view of the base stricture, measuring wheels and rotating components of a disclosed measuring;

FIG. 8A is an enlarged view of the components supported by the base as shown in FIG. 7;

FIG. 8B is an enlarged partial view of the emitter, receiver and encoder wheel components shown in FIG. 8A;

FIGS. 8C-8E are plan views of encoder disk designs that may be incorporated into the measuring device disclosed herein;

DETAILED DESCRIPTION OF THE PRESENTLY PREFERRED EMBODIMENTS

Figure 1:
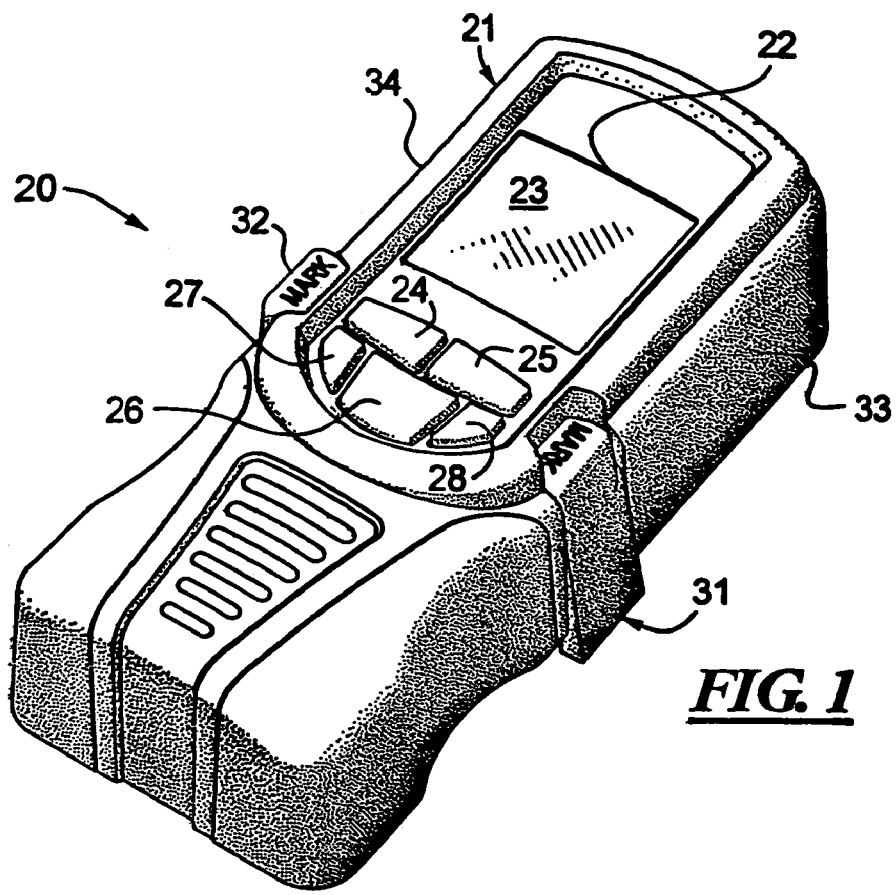
FIG. 1 is a top perspective view of a measuring device made in accordance with this disclosure.

FIG. 1 illustrates a measuring device 20 that includes an upper housing 21 with an opening 22 for a display 23, preferably a LCD. The housing 21 also includes a plurality of openings providing the user with access to control buttons 24, 25, 26, 27 and 28. Further, the device 20 also includes end stops 31, 32 disposed in side walls 33, 34 respectively for providing convenient start and stop points for a measurement and for marking the surface being measured as described in greater detail below.

Figure 2:
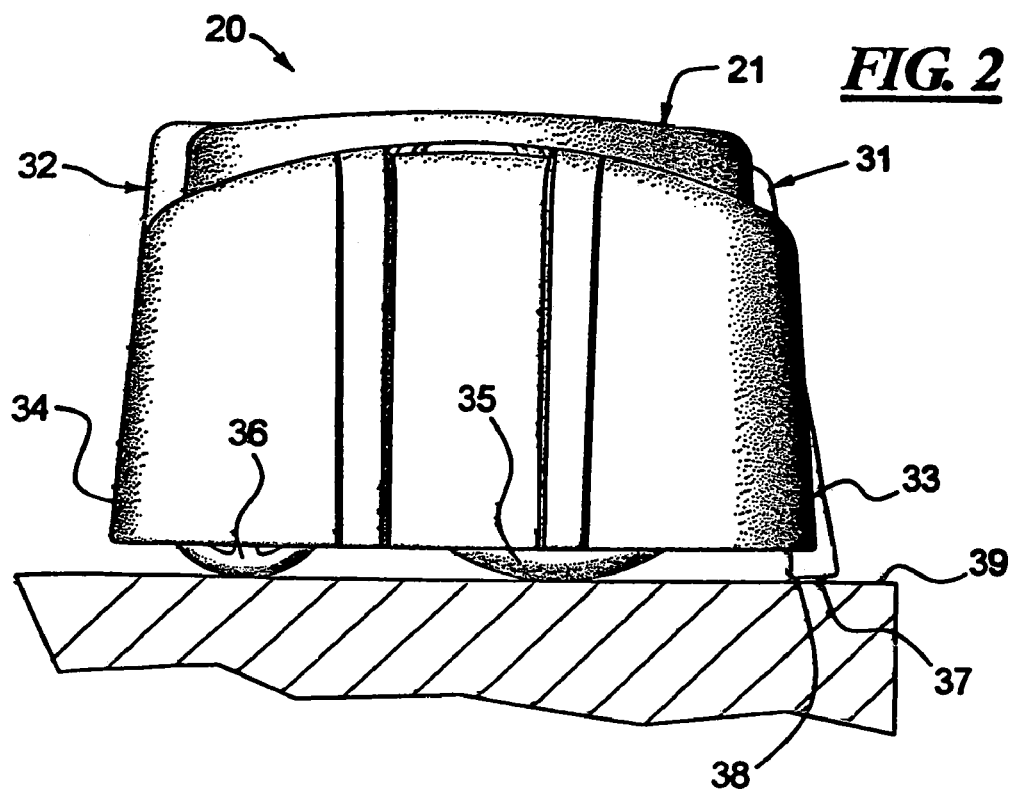
FIG. 2 is an end view of the device shown in FIG. 1 with one of the end stops in a first lower position thereby enabling the tapered point to engage the surface being measured to provide a mark on the surface in alignment with the outermost surface of the side wall of the device.
Figure 7:
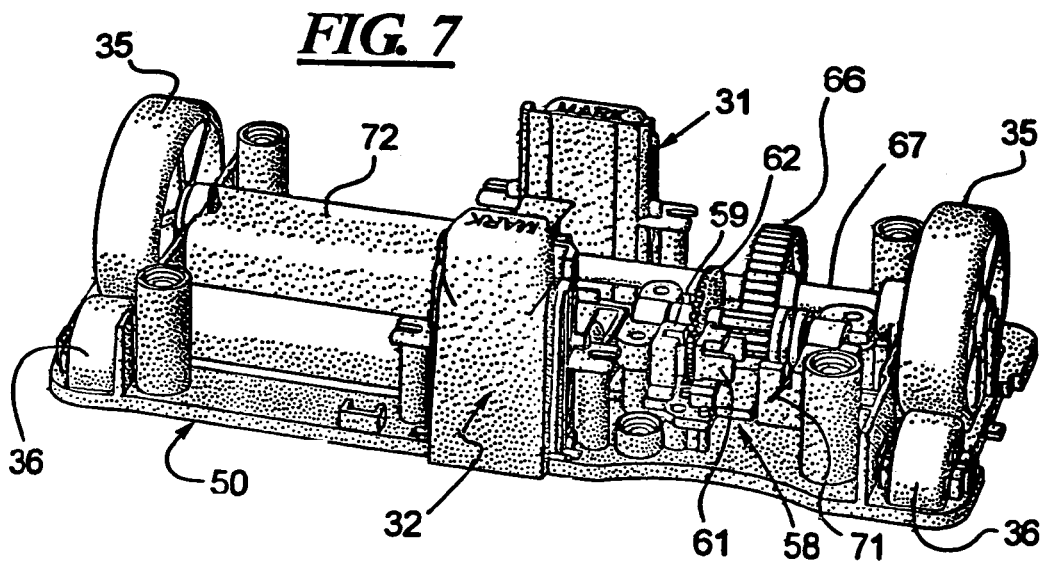

Turning to FIG. 2, the rolling device 20 includes a measuring wheel 35 (in this case a pair of measuring wheels 35 as shown in FIG. 7) that engages the surface to be measured. In a preferred embodiment, a pair of guide rollers shown at 36 is also provided. Preferably, two wheels 35 are utilized as the use of two wheels 35 makes it easier for the user to roll the device 20 in a straight line.

In FIG. 2, the end stop 31 has been pushed downward, overcoming the bias of a spring (See 47 in FIG. 4) so that a tapered point 37 disposed at a lower distal end 38 of the end stop 31 engages the surface 39 being measured. In the "first" lower position shown in FIG. 2 (or "second" lower position shown FIG. 3 and discussed below), the end stop 31 can be used as either a start or a stop point for a measurement. The tapered point can also be used to make an indentation in the surface 39 and is particularly useful for sheet rock, drywall and wood.

Figure 3:
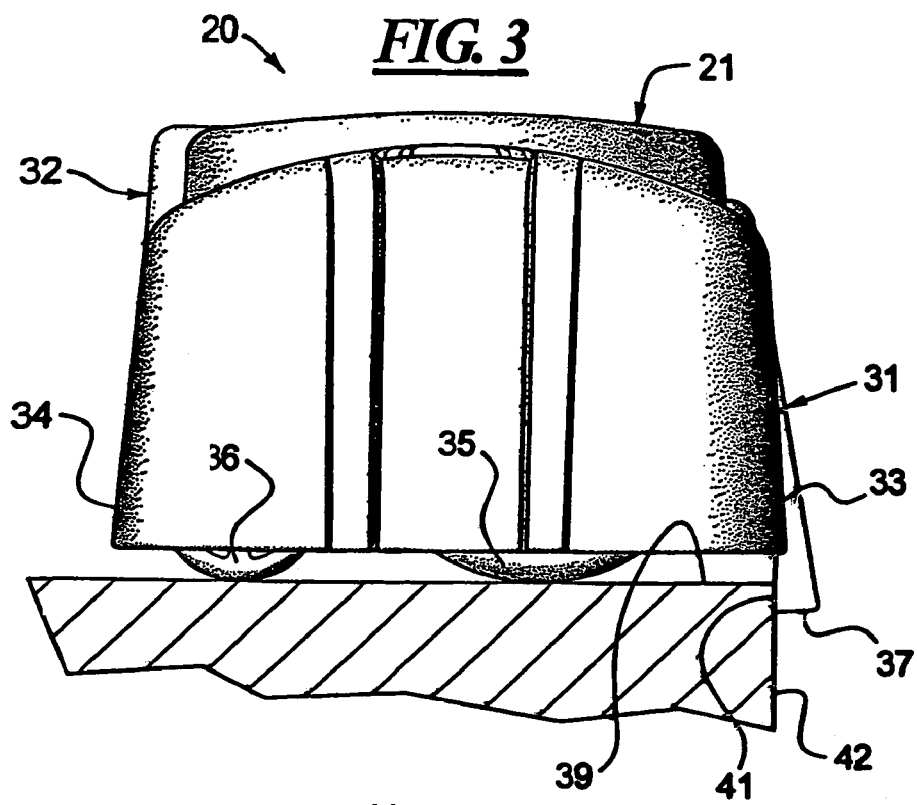
FIG. 3 is another end view of the measuring device shown in FIGS. 1 and 2 with one of the end stops in an second fully lowered position with an inner wall of the end stop being disposed below the surface being measured and with the inner surface of the end stop being in alignment with an outermost surface of the side wall of the device thereby providing a starting point or an end point for the length or distance being measured.

In FIG. 3, the end stop 31 has been lowered to the end if its range as discussed below with respect to FIG. 4 so that an inner surface 41 of the end stop 31 engages an end wall 42 of the surface 39 being measured. In both FIGS. 2 and 3, the end stop 31 (and the same applies for the end stop 32) serves as an accurate starting or finishing for a measurement. Specifically, in the "first" lower position shown in FIG. 2, the tapered point 37 is in vertical alignment with an outermost portion of the side wall 33 of the upper housing 21.

Thus, in the position in FIG. 2, the tapered point 37 can serve as a convenient start or finishing point for the measurement. Similarly, in "second" or "lowermost" position shown in FIG. 3, the inner surface 41 of the end stop 31 is also in vertical alignment with an outermost portion of the sidewall 33 thereby also serving as a convenient starting or stopping point for a measurement.

Figure 4:
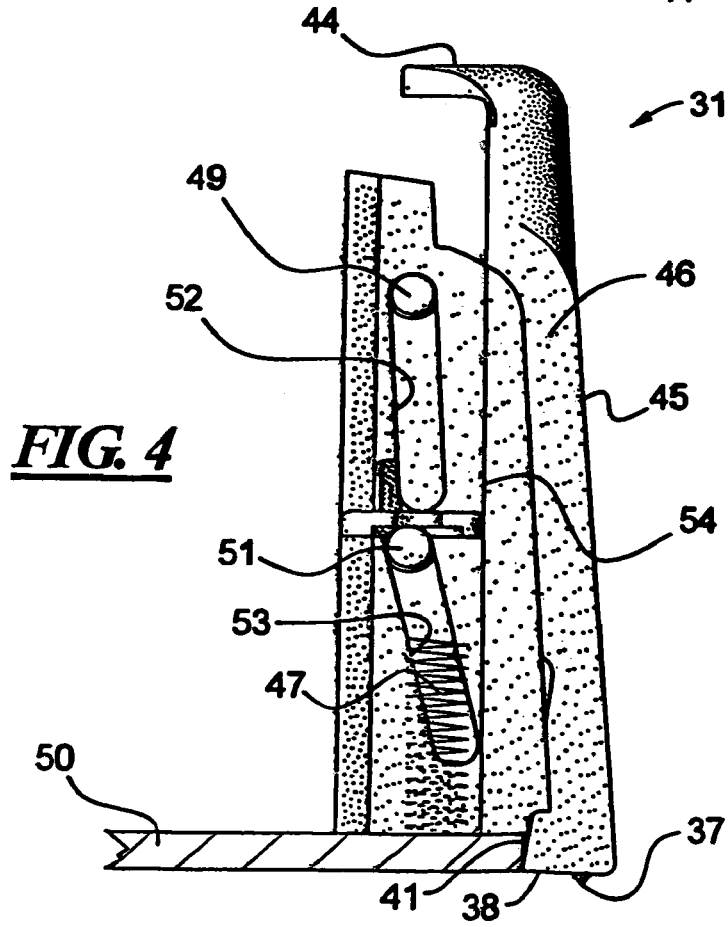
FIG. 4 is a partial sectional view of the device shown in FIGS. 1-3 illustrating the slidable connection between the end stop and the housing of the measuring device while the end stop is in its upper or retracted position.

The end stop 31 is shown in greater detail in FIG. 4. Specifically, the end stop 31 includes an upper thumb or finger grip 44 connected to a vertical wall 45 that terminates in the distal end 38 which features the tapered point 37. The end stop 31 is biased into an upper position shown in FIG. 4 by the spring 47. The vertical portion 45 of the end stop 31 is connected to opposing side walls, one of which is shown at 46. Each side wall 46 of each end stop 31 (and 32) is connected to two pawls shown at 49 and 51. The pawls 49, 51 each ride in elongated slots 52, 53 respectively that are disposed in the vertical wall shown at 54 in FIG. 4.

In FIG. 4, the end stop 31 shown in its upper or retracted position under the bias of the spring 47. The pawls 49, 51 are disposed at the upper ends 52a, 53a of the slots 52, 53 respectively. In first lower position shown in FIG. 2, the pawls 49, 51 are between the upper (52a, 53a) and lower (52b, 53b) ends their respective slots 52, 53 and the orientation of the slots 52, 53 in the wall 54 maintain the tapered point 37 in vertical alignment with an outermost portion of the sidewall 33 so that the mark or indentation made by the point 37 on the surface 39 is accurately aligned with the sidewall 33 of the device 20.

As the end stop 31 is pushed further downward towards the fully extended position shown in FIG. 3, the inner surface 41 of the end stop 31, in turn, moves into vertical alignment with an outermost portion of the side wall 33 as shown in FIG. 3 when the pawls 49, 51 are disposed at the lower ends 52b, 53b of their respective slots 52, 53. The slots 52, 53 are disposed within a wall structure shown at 54 that may be formed from the base 50 as shown in FIG. 7 or which may be a molded portion of the upper housing 21 or a separate component altogether. As shown in FIGS. 7 and 8, each end stop 31, 32 includes a pair of sidewalls 46 and two sets of pawls 49, 51 and the base 50 or housing 21 provides two pairs of slots 52, 53 for each end stop 31, 32.

Figure 5:
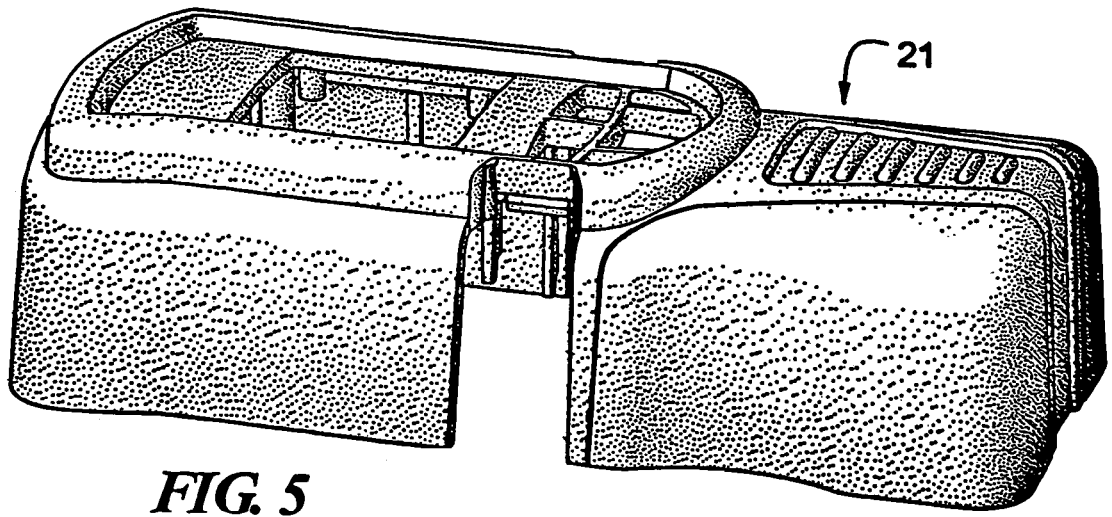
FIGS. 5-7 provide an exploded view of the disclosed measuring device with FIG. 5 being a perspective view of the upper housing of the measuring device shown in FIGS. 1-3.
Figure 6:
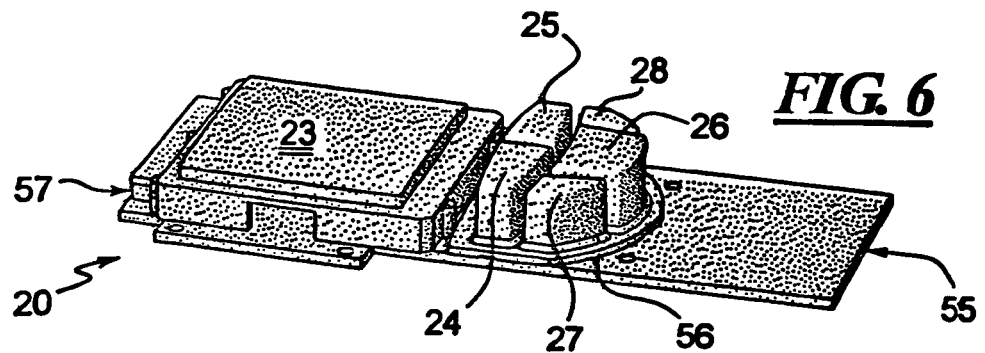

Turning to FIGS. 5-7, the upper housing 21 serves as an enclosure for a PCB 55 which is connected to and supports the button pad 56, controller 57 and LCD 23. The PCB 55 is connected electrically to another PCB 58 which is mounted to the base 50. The PCB 58 is connected to and supports the emitter 59 and dual receiver 61. The emitter 59 directs light towards the receiver 61. Preferably, for reasons discussed below, the receiver 61 is a dual receiver with two separate receiving elements.

Referring to FIGS. 7 and 8A-8E, a finned encoder disk or wheel 62 rotates between the emitter 59 and the receiver 61. The encoder disk 62 as shown in FIGS. 7, 8A and 8C includes a plurality of fins 63 that are spaced apart with uniform gaps or openings 64 disposed between the fins 63. The encoder disk 62 also includes a hub 70 which accepts an axle 78 (see FIGS. 5C-8E) for coaxially connecting the disk 62 to the gear 65 (see FIG. 8A).

The gaps or openings 64 of the disk 62 (FIG. 5C) may also be in the form of circumferentially spaced-apart through-holes 64a as shown in the disk 62a of FIG. 8D. Still referring to FIG. 5D, the solid material 63a disposed between such through-holes 64a serve the function of blocking light like the fins 63 as shown in FIGS. 7, 8A and 8C. Another alternative is shown in FIG. 8E where the disk 62b is made of an optically clear material with circumferentially spaced-apart opaque markings 63b disposed between clear light transmitting openings 64b. In generally, the encoder disk 62 includes a plurality of circumferentially space-apart opaque sections 63, 63a, 63b disposed between a plurality of circumferentially spaced-apart translucent or transparent sections 64, 64a, 64b. Other encoder disk 62 designs will be apparent to those skilled in the art.

In the embodiment shown in FIGS. 7 and 8A, the encoder disk 62 is coaxially connected to a splined shaft or gear 65 by the axle 78 (see FIGS. 8C-8E). The gear 65 is enmeshed with a drive gear 66 mounted on the axle 67. The axle 78 passing through the encoder disk 62 and gear 65 is supported at either end (not shown) by the bearings shown at 68a, 68b. Preferably, the bearing 68b has an elliptical or non-circular hole for loosely accommodating and supporting the axle 78 so that one end of the axle 78 can move in an limited manner against the bias of the spring 71 to prevent backlash when the direction of the travel of the device 20 is quickly reversed.

Thus, to maintain a proper coupling between the gears 65 and 66, the spring 71 may be used to bias the gear 65 towards the drive gear 66. Again, it will be noted that the encoder disk 62 can be directly coupled to or mounted on the axle 67. The disclosed gear train 66, 65 has been employed to conserve space within the housing 21.

Preferably, the device 20 is battery operated and a battery housing is shown at 72. A plurality of support posts are shown at 73 and are used to receive a screw from the underside of the base 50 to connect to base 50 to the upper housing 21. The PCB 55 may be secured to the underside of the upper housing 21 or may be mounted to the base member 50. In any event, the PCB 55 is electrically linked to PCB 58 or separately linked to the emitter 59 and receiver 61.

Therefore, as the device 20 is rolled across the surface 39 to be measured, the wheels 35 roll across the surface 39. The wheels 35 are preferably coated with rubber, thermoplastic rubber, or another similar material. As the wheels 35 rotate, the drive gear 66 rotates and, in turn, rotates the gear or splined shaft 65 which, in turn, rotates the encoder disk 62. When the device 20 has been turned on, light is emitted from the emitter 59 and directed towards the receiver 61. Preferably, the receiver 61 includes a pair of receiving elements. The controller 57 counts the number of fins 63 (or openings 64) that pass between the emitter 59 and receiver 61 as the fins 63 block the transmission of light between the emitter 59 and receiving elements disposed on the receiver 61. By counting the number of fins 63 that pass between the emitter 59 and receiver 61 (or, by counting the number of openings 64 that pass between the emitter 59 and receiver 61), the controller 57 can compute the distance traveled by the wheels 35. Further, by using a dual receiver 61 with two receiving elements 61a, 61b, the controller 57 can determine which direction the device 20 is being moved by the order in which light from the LED element 59a is blocked from the spaced apart receiving elements 61a, 61b by the passing fins 63.

Further, the controller 57 of the device 20 can accommodate for the width of the device 20 or the distance between the side walls 33 and 34 as follows. By pressing one of the buttons, in this example, the button 24, the user indicates to the controller 57 that the side 33 with the end stop 31 of the device 20 is the active measuring side or edge. At the conclusion of the distance measurement, the user then may keep the side 33 as the active measuring side or, in the event, the device 20 engages a vertical wall, the user may then press another button, such as the button 25, to indicate to the controller 57 that the opposite side 34 is now the active measuring side. The controller will then add the width of the device between the sides 33 and 34 to the length measured.

Further, the controller 57 is preferably programmed to divide the measured distance into a number of equal segments or points. The button 27 can be used for this purpose. In a preferred embodiment, if a distance is to be divided by four equal segments or four points, the button 27 is pressed four times. If the distance is to be divided by ten equal segments, the button 27 is pressed ten times. The button 28 may used as a clear or zero button and the button 26 may be used as a combination start/stop button as well as a power-on button. The configuration and function assignments of the buttons may vary greatly and only one examples is provided here.

Figure 9:
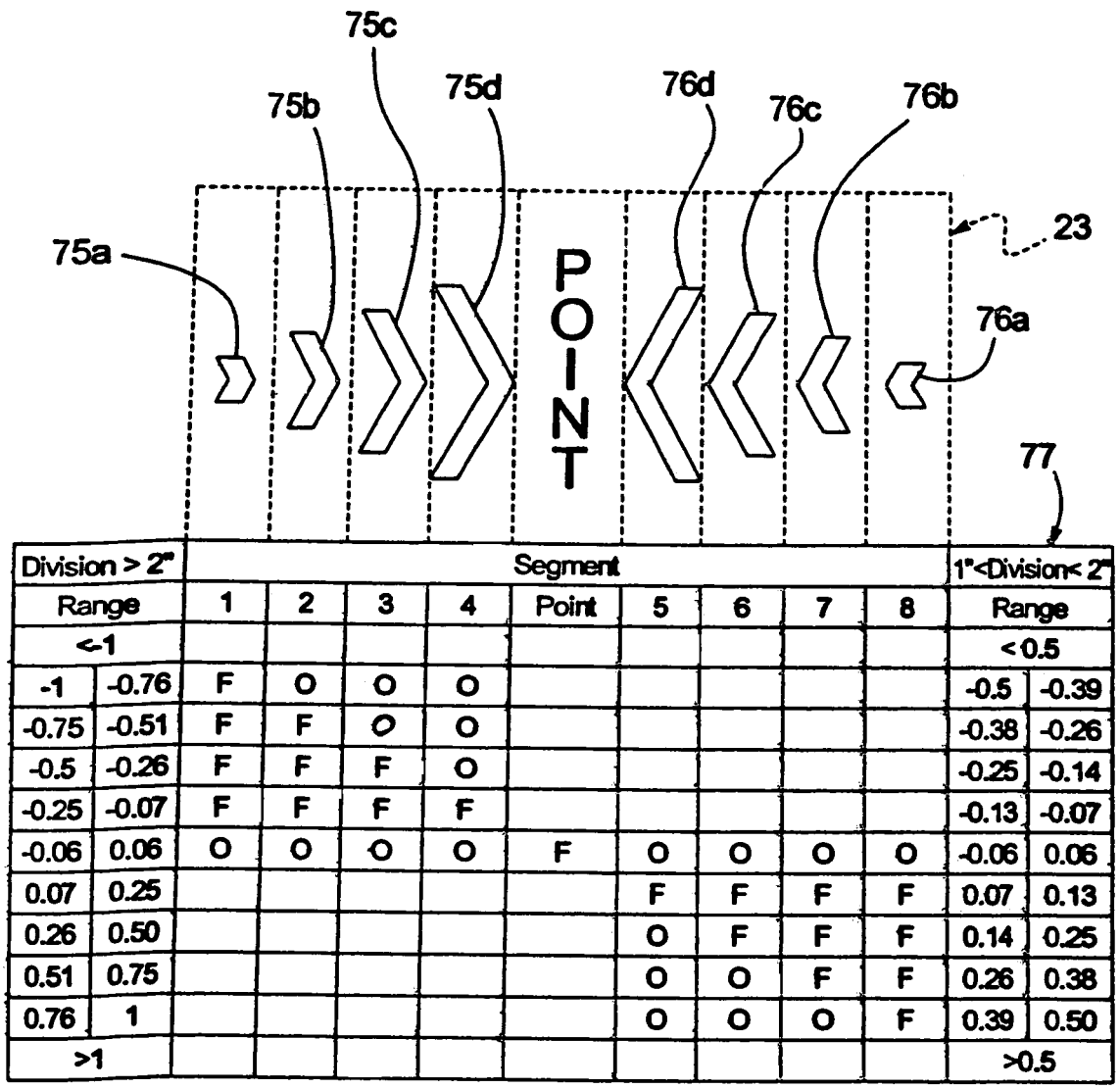
FIG. 9 is an illustration of the LCD of the disclosed device and a table indicating which indicia will be disclosed on the LCD as the device approaches and passes a "point" dividing equal segments of the measured distance as computed by the controller at the command of the user.

Turning to FIG. 9, the display 23 is shown when the user has selected the "points divide" option by repeatedly depressing the button 27. For segments that are greater than two inches, the left arrows shown at 75a-75d or the right arrows shown at 76a-76d will begin flashing as the device approaches within one inch of a point or segment boundary and the arrows become successively bigger, i.e., 75a, 75b, 75c and then 75d or 76a, 76b, 76c and then 76d at approximately quarter-inch intervals as the device 20 approaches the point or segment boundary. This data is shown at the left of the table 77. As shown towards the right in the table 77, when the segments are between one and two inches, the "warning" arrows 75a or 76a appear on the screen 23 when the device becomes within one half inch of the segment boundary or point and the arrows become larger at intervals of 0.12, 0.13 and 0.12 inches as shown towards the right of the table 77 in FIG. 9.

Figure 10:
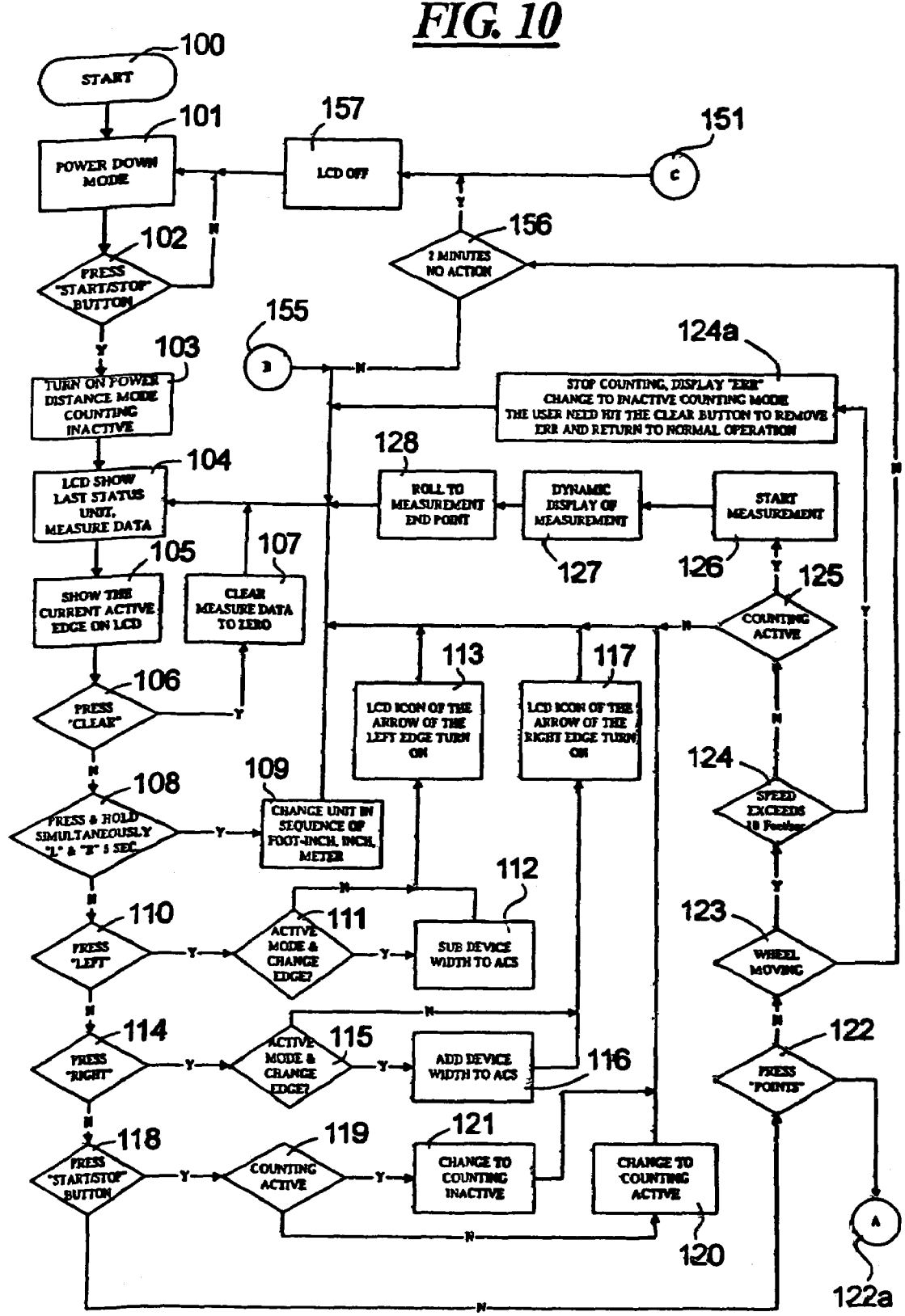
FIG. 10 is a partial logic flow chart of the software stored on the controller shown in FIG. 6.
Figure 11:
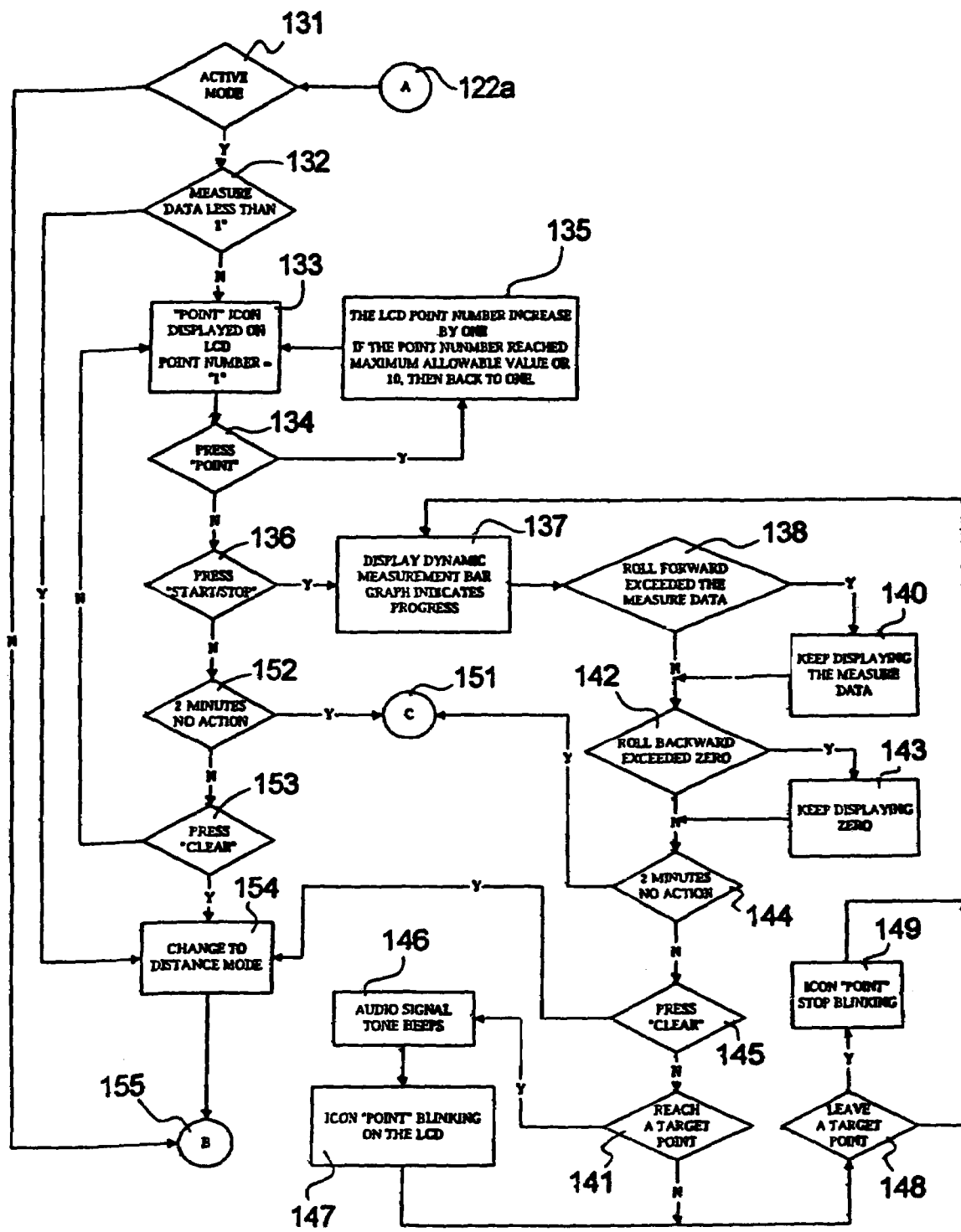
FIG. 11 is another partial logic flow chart for the software stored on the controller shown in FIG. 6.

FIGS. 10 and 11 illustrate logic flow charts for software that may be stored in the memory of the controller 57. The flow charts and logic shown in FIGS. 10-11 and merely one example of the many types of programs that could be used. At 100, the user decides to take a measurement using the device 20, which is turned off or in the power down mode as shown at 101 and the user presses the power on button 26 at 102 to power up the device at 103. At 104, the LCD indicates the last status and units of measurement data. At 105, the controller 57 indicates the current active measuring edge, i.e., the end stop 31 or the end stop 32 on the LCD 23. At this point, to begin a new measurement, the user may press the clear button 28 at 106 to clear the previously stored data at 107 to redisplay the cleared status at 104 and current active edge at 105 as shown by the loop 106-107-104-105-106. At 108, the user may then change the units of measurement at 108 by simultaneously pressing and holding the buttons 24 and 25 down for five seconds whereby the controller enters the loop 108-109-104-105-108 as shown in FIG. 10. To use the left end stop 31 as the active measuring edge and the controller determines at 111 if this would be a change from using the right end stop 32 as the active measuring edge and, if so, would subtract the width of the device at 112 and the display 23 would indicate that the left edge is the active measuring edge at 113. Similarly, if the right end stop 32 is selected as the active measuring edge at 114 and the controller 57 determines that this would be a change at 115, the controller 57 adds the width of the device to the measurement at 116 and makes an appropriate indication on the display 23 at 117. To begin counting, the user then presses the start/stop button 26 again at 118 and, if the controller 57 determines that the device is not already active at 119, the controller 57 changes the active counting system (ACS) to active at 120 to begin taking measurement data. If the system is already active, the controller 57 then changes the system to inactive at 121.

Then, the controller again passes through the loop 104-105-106-108-110-114-118 and, if the user is beginning to take an initial measurement, the user will not press the points divide button 27 at 122 but, instead, will begin rolling the device whereby the controller will detect movement of the wheels 35 by way of the mechanism described in FIGS. 7 and 8 above to activate the ACS system. In an embodiment, the speed limit is 10 feet per second and the speed limit is checked at 124 (and an error signal can be generated at 124a) before the active status is confirmed at 125 and the measurement begins at 126 and the controller 57 continuously displays the measurement data on the screen 23 at 127 before the user stops the device at 128. Again, proceeding through the loop shown at 104-105-106-108, the user then may change the active measuring edge of the device at either 110 or 114 to either result in an addition or subtraction of the width of the device 20. If no such change is made, and the measurement has been completed, the user may then press the points button 27 at 122.

Turning from 122a at FIGS. 10 to 122a at FIG. 11, the controller confirms the active mode status of the device at 131 and, if the device is still in an active mode, the controller 57 will reject the points mode if the measurement is less than one inch at step 132 and, if the measurements is more than one inch, the controller proceeds to 133 and initiates the display of a point number "1" on the display 23 as the points button 27 has been pressed only once. Repeated pressing of the points button 27 at 134 sends the system into the loop 134-135-133-134 until the desired number of points or segments is arrived at. The box 135 indicates that the maximum number of allowable points is 10 but those of ordinary skill in the art will realize that this number is flexible and will depend upon the particular application that the device 20 is intended for. That is, more or fewer than ten points may be desired.

When the desired number of points or segments are entered, the user presses the start/stop button 26 at 136 which initiates the dynamic measurement bar display at 137 that is illustrated and discussed above at FIG. 9. At this point, to mark off the points along the path just measured, the user does not roll the device forward at step 138 but, instead, begins to roll the device backward at step 142 retracing the path just measured. Continued forward movement of the device at 138 will result in a continued display of the measurement data at step 140.

To reach a target point by rolling the device 20 backwards as shown at step 141, the controller 57 continually checks to make sure that the device has not rolled backward past the zero point at 142 (where if the device has rolled past the zero point, the display continues to indicate a zero value at 143), and assuming two minutes of an action have not taken place at 144, and assuming the user has not pressed clear at 145, the first target point is reached at 141 and, optionally, an audio signal is produced at 146 and the icon point number flashes on the screen at 147. As the user continues to move the device 20 backwards retracing the just-measured path, and leaves a target point at 148, the target point icon stops blinking at 149 and the loop 137-138-142-144-145-141-146-147-148-149 is repeated for the next target point. When the device rolls back to the initial starting point and begins to exceed the "0" point, the measurement is complete and eventually two minutes of an action will occur and the logic returns to data FIG. 10 at step 151 or 152. Pressing clear at step 153 will convert the controller 57 to distance mode at 154 to begin a new measurement at 155 returning to the logic flow illustrated in FIG. 10. Again, two minutes of an action (see step 156) will result in the display 23 being turned off at 157.

Accordingly, an improved measuring device 20 is disclosed which can accurately measure distances or lengths along planar or non-planar surfaces easily and conveniently. The device 20 is highly accurate by way of its employment of the end stops 31, 32. The device 20 may easily divide a measured length or distance or equal segments which may then be easily marked with the end stops 31, 32, and both visual and audible indications are provided when the device retraces a measure distance and designated points are approached and passed.

What is claimed is:

1. An electronic measuring device comprising:
   a housing;
   an axle mounted to the housing and coupled to an encoder disk that includes a plurality of circumferentially spaced apart opaque sections with translucent sections disposed between the opaque sections;
   an emitter and a receiver mounted on opposite sides of the encoder disk;
   at least one wheel mounted on the axle to engage and roll on a surface;
   a controller linked to the emitter and receiver that increments a counter in response to the opaque sections and translucent sections of the encoder disk passing between the emitter and the receiver as the wheel rotates;
   at least one control button on the housing, the at least one control button connected to the controller, and
   a display linked to the controller, the display including a segment indicator;
   wherein the controller computes the distance traveled by the wheel along a surface based on the counter,
   wherein the controller divides the distance traveled by the wheel along the surface into a plurality of segments, and
   wherein the controller indicates a first segment being traversed by energizing the segment indicator on the display during a subsequent pass of the wheel along the first segment.

2. The measuring device of claim 1 wherein the display includes a flashing indicator and the controller energizes the flashing indicator as the measuring device approaches a transition from the first segment to a second segment during a subsequent pass of the wheel along the first segment.

3. The measuring device of claim 1 wherein the display includes at least one arrow-shaped indicator that points in the direction of a second segment and wherein the controller energizes the arrow-shaped indicator approximately one inch before the measuring device transitions from the first segment to the second segment during a subsequent pass of the wheel along the first segment.

4. The measuring device of claim 3 wherein the controller energizes the at least one arrow-shaped indicator approximately one half inch before the measuring device transitions from the first segment to the second segment.

5. The measuring device of claim 1 wherein the controller is linked to a speaker that emits an audible tone as the measuring device approaches a transition from the first segment to a second segment during a subsequent pass of the wheel along the first segment.

6. The measuring device of claim 5 wherein the audible tone begins approximately 0.06 inches before the measuring device transitions from the first segment to the second segment.

7. The measuring device of claim 1 wherein the controller energizes at least two arrow-shaped indicators that point in the direction of a second segment as the measuring device approaches a transition from the first segment to the second segment during a subsequent pass of the wheel along the first segment.

8. The measuring device of claim 7 wherein the measuring device energizes at least four arrow-shaped indicators that point in the direction of the second segment.

9. The measuring device of claim 1 wherein the receiver comprises at least two receiving elements that each detect electromagnetic energy from the emitter.

10. The measuring device of claim 1 wherein the wheel is coated with one of rubber and thermoplastic.

11. The measuring device of claim 10 further comprising a second wheel coupled to the axle to engage and roll on the surface.

12. The measuring device of claim 1 wherein the controller adds or subtracts a width of the housing based on start and end measuring points relative to sides of the housing.

13. The measuring device of claim 1 wherein the controller divides the distance measured into a number of equal segments and the number of equal segments is equal to the number of times the at least one control button is activated.

14. A method for measuring a distance along a work surface, the method comprising:
  enabling selection of a start measuring point via a measuring device;
  performing a counting based on one or more opaque and translucent sections of the encoder disk passing between an emitter and a receiver as a wheel of the measuring device rolls along a work surface;
  enabling selection of a stop measuring point via the measuring device;
  determining the distance traveled along the work surface according to the count of opaque and translucent sections that pass between an emitter and a receiver as the wheel rolls along a surface;
  dividing the distance traveled along the work surface into a plurality of segments wherein the number of segments is determined by the number of times a control button is activated on the measuring device.

15. The method of claim 14 further comprising emitting an audible alert as the wheel approaches a transition from a first segment to a second segment during a subsequent pass of the measuring device along the first segment.

16. The method of claim 14 further comprising energizing a visual indication on a display of the measuring device as the wheel approaches a transition from a first segment to a second segment during a subsequent pass of the measuring device along the first segment.

17. The method of claim 14 further comprising energizing a flashing element on a display of the measuring device as the wheel approaches a transition from a first segment to a second segment during a subsequent pass of the measuring device along the first segment.

18. The method of claim 14 further comprising energizing a flashing arrow-shaped element on a display of the measuring device as the wheel approaches a transition from a first segment to a second segment during a subsequent pass of the measuring device along the first segment.

19. The method of claim 18 further comprising energizing at least two flashing elements on a display of the measuring device as the wheel approaches a transition from a first segment to a second segment during a subsequent pass of the measuring device along the first segment.

* * * * *